(12) United States Patent
Lei et al.

(10) Patent No.: US 10,638,389 B2
(45) Date of Patent: Apr. 28, 2020

(54) WIRELESS DATA TRANSMISSION

(71) Applicant: Microsoft Technology Licensing, LLC, Redmond, WA (US)

(72) Inventors: Haipeng Lei, Beijing (CN); Kodo Shu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 14 days.

(21) Appl. No.: 15/828,132

(22) Filed: Nov. 30, 2017

(65) Prior Publication Data
US 2018/0160349 A1 Jun. 7, 2018

Related U.S. Application Data

(63) Continuation of application No. 14/697,207, filed on Apr. 27, 2015, now Pat. No. 9,848,364.

(51) Int. Cl.
| | |
|---|---|
| *H04W 36/08* | (2009.01) |
| *H04L 1/00* | (2006.01) |
| *H04L 1/18* | (2006.01) |
| *H04L 5/00* | (2006.01) |
| *H04W 36/00* | (2009.01) |
| *H04W 16/14* | (2009.01) |

(52) U.S. Cl.
CPC ............... *H04W 36/08* (2013.01); *H04L 1/00* (2013.01); *H04L 1/18* (2013.01); *H04L 1/1812* (2013.01); *H04L 1/1887* (2013.01); *H04L 5/00* (2013.01); *H04L 5/001* (2013.01); *H04L 5/0098* (2013.01); *H04W 16/14* (2013.01); *H04W 36/0069* (2018.08)

(58) Field of Classification Search
CPC ...... H04W 36/30; H04W 36/08; H04W 76/27
See application file for complete search history.

(56) References Cited

U.S. PATENT DOCUMENTS

| | | | |
|---|---|---|---|
| 9,503,978 B2 * | 11/2016 | Ji | ..................... H04W 52/0216 |
| 2010/0157895 A1 | 6/2010 | Pani et al. | |
| 2014/0036889 A1 | 2/2014 | Kim et al. | |

(Continued)

FOREIGN PATENT DOCUMENTS

| | | |
|---|---|---|
| WO | 2015094751 A1 | 6/2015 |
| WO | 2015188557 A1 | 12/2015 |

OTHER PUBLICATIONS

"Non Final Office Action Issued in U.S. Appl. No. 14/697,207", dated Jan. 25, 2017, 7 Pages.

(Continued)

*Primary Examiner* — Chandrahas B Patel

(57) ABSTRACT

The subject matter described herein relates to data communication in wireless communication systems. The device determines availability of scheduled serving cell before data communication and informs a device the determined availability of the scheduled serving cell. Depending upon the determined availability, the device is controlled to perform the data communication on the scheduled serving cell or another available serving cell. In this way, the unfinished data communication, for example, retransmission of a data block in an uplink or downlink HARQ process can be continued on an available serving cell, whereby avoiding large transmission delay and throughput loss in the wireless communication system.

20 Claims, 9 Drawing Sheets

(56) References Cited

U.S. PATENT DOCUMENTS

2015/0156693 A1   6/2015  Tabet et al.
2015/0172931 A1   6/2015  Jose et al.

OTHER PUBLICATIONS

"Office Action Issued in European Patent Application No. 16706039.1", dated May 9, 2018, 5 Pages.

"Candidate Solutions for LAA Operation", Retrieved from <<http://www.3gpp.org/ftp/tsg_ran/WG1_RL1/TSGR1_78b/Docs/R1-144042.zip»>, Oct. 6, 2014, 6 Pages.

"Considerations on LBT Enhancements for Licensed-Assisted Access", Retrieved from <<http://www.3gpp.org/ftp/tsg_ran/WG1_RL1/TSGR1_78b/Docs/R1-144083.zip>>, Aug. 6, 2014, 6 Pages.

"Deployment Scenarios and Evaluation Methodology for LAA-LTE", Retrieved from <<http://www.3gpp.org/ftp/tsg_ran/WG1_RL/TSGR1_78b/Docs/R1-143727.zip>>, Oct. 6, 2014, 11 Pages.

"Potential Design Options for LAA Using LTE", Retrieved from <<http://www.3gpp.org/ftp/tsg_ran/WG1_RL1/TSGR1_78b/Docs/R1-143776.zip>>, Oct. 6, 2014, 3 Pages.

"Required Functionalities for Licensed-Assisted Access Using LTE", Retrieved from <<http://www.3gpp.org/ftp/tsg_ran/WG1_RL1/TSGR1_78b/Docs/R1-143751.zip>>, Oct. 6, 2014, 4 Pages.

"International Search Report and Written Opinion Issued in PCT Application No. PCT/US2016/013983", dated May 27, 2016, 12 Pages.

"Extended European Search Report Issued in European Patent Application No. 19203459.3", dated Nov. 11, 2019, 11 Pages.

* cited by examiner

WIRELESS DATA TRANSMISSION

RELATED APPLICATIONS

This application is a continuation application that claims priority to U.S. application Ser. No. 14/697,207, filed on Apr. 27, 2015, and entitled "WIRELESS DATA TRANSMSSION", which claims priority to International Application No. PCT/CN2015/000065, filed on Jan. 29, 2015, and entitled "WIRELESS DATA TRANSMISSION." This application claims the benefit of the above-identified applications, and the disclosure of the above-identified applications are hereby incorporated by reference in their entireties as if set forth herein in full for all intents and purposes.

TECHNICAL FIELD

The non-limiting and example embodiments of the present disclosure generally relate to wireless communications, and specifically to methods and apparatuses for data transmission in a wireless communication system.

BACKGROUND

In wireless communication, the demand for high data rate keeps increasing and Long Term Evolution (LTE) developed by the third generation project partnership (3GPP) has proven an extremely successful platform to meet such demand. The LTE system has been designed to operate in a dedicated and licensed band to avoid interference with other systems and to guarantee satisfying communication performance. However, because the demand for high data rate keeps increasing while available licensed frequency resources keeps shrinking, more and more cellular network operators are considering the utilization of the unlicensed spectrum as a complementary tool to augment their service offering.

One way to utilize an unlicensed band is called "Licensed-Assisted Access (LAA)", where the utilization of the unlicensed band is under control from the licensed band. LTE LAA is a topic to be studied in 3GPP LTE-Advanced Rel-13 and beyond. The objective of LTE LAA is to investigate the basic aspects for the operator-controlled non-standalone deployment of LTE in unlicensed spectrum, considering uplink and downlink or downlink only transmission in the unlicensed spectrum, to further improve network throughput and provide offloading capability to meet the demand of increasing traffic volume.

Particularly, LTE LAA can use carrier aggregation (CA) to aggregate the carriers in unlicensed spectrum, (e.g., using unlicensed carrier as a Supplemental Downlink or a Component Carrier). In such a scenario, a primary cell (also called PCell, primary carrier, or primary component carrier) for either a LTE frequency division duplex (FDD) or time division duplex (TDD) system can always operate in a licensed band to carry control signaling, mobility management and data, while one or more secondary cells (also called SCells, secondary carriers, or secondary component carriers herein) in unlicensed band can provide downlink (DL) and/or uplink (UL) data transmission for opportunistic capacity improvement.

SUMMARY

The unlicensed band is shared by various wireless devices and networks, rather than dedicated for specific use. Therefore, for a system operating in the unlicensed band, co-channel interferences from other wireless systems has to be addressed. To alleviate the interference problem, the listen-before-talk (LBT) feature has been introduced into the systems operating in the unlicensed band, and has been made mandatory in some countries/regions. This feature has also been agreed upon for LTE LAA in 3GPP RAN1#78bis meeting, and the physical layer design of LTE LAA should take the LBT feature into account. Particularly, a LTE Evolved Node B (eNB) or User Equipment (UE) should measure the unlicensed spectrum before transmitting on the unlicensed spectrum.

The introduction of LBT mechanism may have an impact on data transmission, especially for Hybrid Automatic Repeat reQuest (HARQ) performance of LAA, because the availability of transmission opportunity on unlicensed band cannot be guaranteed. It results in ongoing data transmission such as HARQ processes may be interrupted due to the requirement of idle period or unavailability of operating channel after a Clear Channel Assessment (CCA) check. When the unlicensed channels are heavily loaded, the interruption in data transmission may happen frequently and retransmission of a data block in the HARQ process may be delayed for a long time.

In accordance with embodiments of the subject matter described herein, the problem can be alleviated by allowing a device to determine availability of a scheduled serving cell before data communication and inform other device of the determined availability of the scheduled serving cell. Depending upon the determined availability, the device is controlled to perform the data communication on the scheduled serving cell or an available serving cell. In one embodiment of the subject matter described herein, the first serving cell may be operated in a licensed band and the second serving cell may be operated in an unlicensed band.

In this way, even if the scheduled serving cell is operated in an unlicensed band and the data transmission is interrupted due to the unavailability of transmission opportunity on the unlicensed band (e.g., the unfinished uplink or downlink data transmission), retransmission of a data block in an uplink or downlink HARQ process can be continued on another available serving cell. As such, large transmission delay and throughput loss in the wireless communication system can be avoided.

This Summary is provided to introduce a selection of concepts in a simplified form. The concepts are further described below in the Detailed Description. This Summary is not intended to identify key features or essential features of the claimed subject matters, nor is it intended to be used to limit the scope of the claimed subject matters.

BRIEF DESCRIPTION OF THE DRAWINGS

Embodiments of the subject matter described herein are illustrated by way of example and not limited in the accompanying figures in which like reference numerals indicate similar elements and in which.

DETAILED DESCRIPTION

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

As used herein, the term "base station" (BS) may represent a node B (NodeB or NB), an evolved NodeB (eNodeB or eNB), a Remote Radio Unit (RRU), a radio header (RH), a remote radio head (RRH), a relay, a low power node such as a femto, a pico, and so forth.

As used herein, the term "user equipment" (UE) refers to any device that is capable of communicating with the BS. By way of example, the UE may include a terminal, a Mobile Terminal (MT), a Subscriber Station (SS), a Portable Subscriber Station (PSS), a Mobile Station (MS), or an Access Terminal (AT). Specifically, some examples of UEs include devices operable in unlicensed band.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
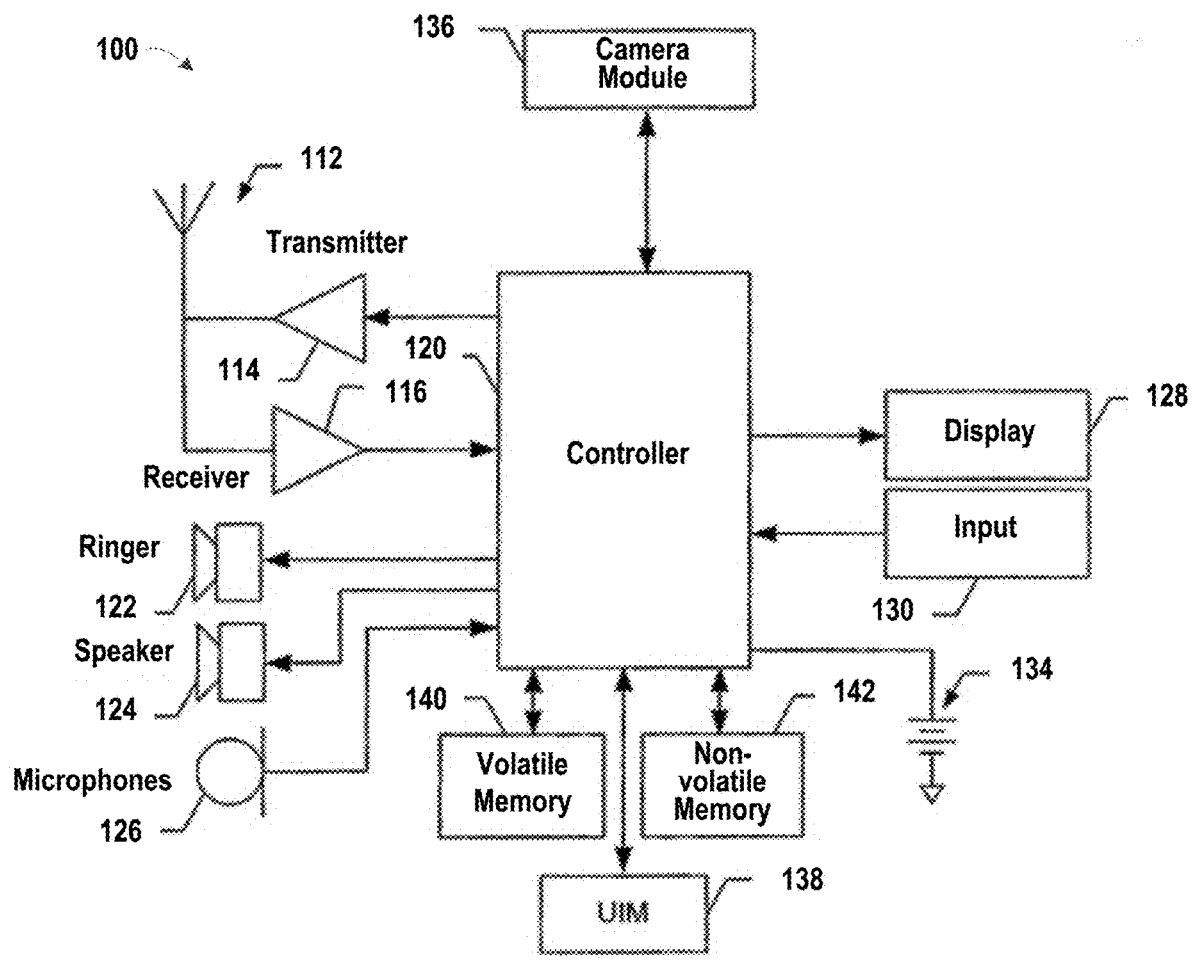
FIG. 1 illustrates a block diagram of a device in accordance with one embodiment of the subject matter described herein.

FIG. 1 illustrates a block diagram of a device 100 in accordance with one embodiment of the subject matter described herein. In one embodiment, the device 100 may be UE, which may be any device with wireless communication capability, such as a mobile phone, a portable digital assistant (PDA), a pager, a mobile computer, a mobile TV, a game apparatus, a laptop, a tablet computer, a camera, a video camera, a GPS device, and other types of voice and textual communication system. A fixed-type device may likewise easily use embodiments of the subject matter described herein.

As shown, the device 100 comprises one or more antennas 112 operable to communicate with the transmitter 114 and the receiver 116. With these antennas, the device 100 may perform cellular communications with one or more devices, such as BS or other UEs. Specifically, the device 100 may be configured to operate in a licensed band or an unlicensed band, and may be configured to perform LBT when operating in an unlicensed band, for example, for contention based access.

The device 100 further comprises at least one controller 120. It should be understood that the controller 120 comprises circuits or logic required to implement the functions of the device 100. For example, the controller 120 may comprise a digital signal processor, a microprocessor, an A/D converter, a D/A converter, and/or any other suitable circuits. The control and signal processing functions of the device 100 are allocated in accordance with respective capabilities of these devices.

Optionally, the device 100 may further comprise a user interface, which, for example, may comprise a ringer 122, a speaker 124, a microphone 126, a display 128, and an input interface 130, and all of the above devices are coupled to the controller 120. The device 100 may further comprise a camera module 136 for capturing static and/or dynamic images.

The device 100 may further comprise a battery 134, such as a vibrating battery set, for supplying power to various circuits required for operating the device 100 and alternatively providing mechanical vibration as detectable output. In one embodiment, the device 100 may further comprise a user identification module (UIM) 138. The UIM 138 is usually a memory device with a processor built in. The UIM 138 may comprise a subscriber identification module (SIM), a universal integrated circuit card (UICC), a universal user identification module (USIM), or a removable user identification module (R-UIM), etc. The UIM 138 may comprise a card connection detecting apparatus according to embodiments of the subject matter described herein.

The device 100 further comprises a memory. For example, the device 100 may comprise a volatile memory 140, for example, comprising a volatile random access memory (RAM) in a cache area for temporarily storing data. The device 100 may further comprise other non-volatile memory 142 which may be embedded and/or movable. The non-volatile memory 142 may additionally or alternatively include EEPROM and flash memory. The memory 140 may store any item in the plurality of information segments and data used by the device 100 so as to implement the functions of the device 100. For example, the memory may contain machine-executable instructions which, when executed, cause the controller 120 to implement the method described below.

It should be understood that the structural block diagram in FIG. 1 is shown only for illustration purpose, without suggesting any limitations on the scope of the subject matter described herein. In some cases, some devices may be added or removed as required.

Figure 2A:
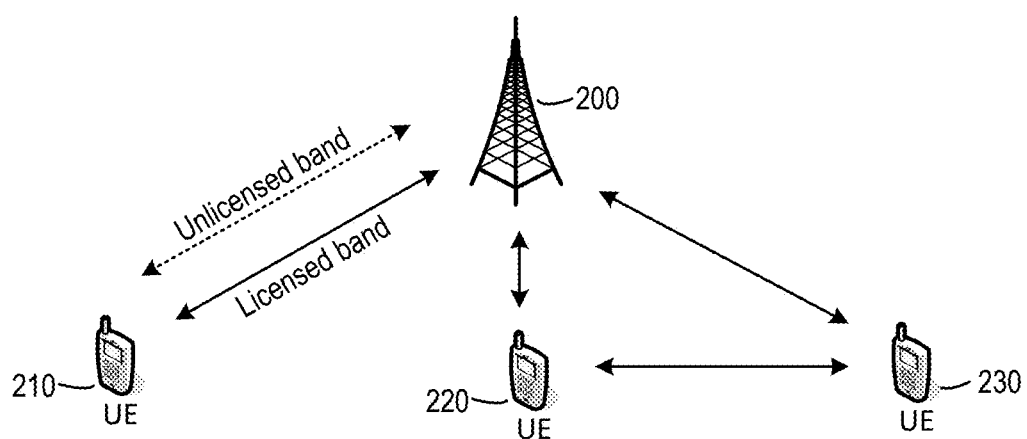
FIG. 2a illustrates a block diagram of an environment in which embodiments of the subject matter described herein may be implemented.

FIG. 2a shows an environment of a wireless communication system in which embodiments of the subject matter described herein may be implemented. As shown in FIG. 2a, one or more UEs may communicate with a BS 200, such as an evolved NodeB (eNodeB). In this example, there are three UEs 210, 220 and 230 shown, but this is only for the purpose of illustration without suggesting limitations on the number of UEs. There may be any suitable number of UEs in communication with the BS 200. In one embodiment, one or more of the UEs 210, 220 and 230 may be implemented as the device 100 as shown in FIG. 1, for example. In addition, a UE may communicate with another UE directly, e.g., via device-to-device (D2D) communication. In the example, D2D paired devices are illustrated by UE 220 and UE 230.

The communications between the UEs 210, 220 and 230 and the BS 200, and between the UE 211 and the BS 201 may be performed according to any appropriate communication protocols including, but not limited to, the first generation (1G), the second generation (2G), 2.5G 2.75G, the third generation (3G), the fourth generation (4G) communication protocols, and/or any other protocols either currently known or to be developed in the future. Though for illustration purpose, in some embodiment of the disclosure, the UEs 210, 220 and 230 and the BS 200 may communicate using 3GPP LTE technique, the embodiments of the present disclosure are not limited to such network scenarios.

The wireless communication system as shown in FIG. 2a may be deployed in both licensed and unlicensed bands. The unlicensed band may be shared with various other wireless systems (for example a Wi-Fi system) in a contention-based way. As shown in FIG. 2a, in a Carrier Aggregation (CA) scenario, the UE 210, for example, is configured with more than one serving cell (i.e., PCell and SCells). Some serving cells may be operated in the licensed band, while other serving cells may be operated in the unlicensed band.

As described above, the introduction of the LBT mechanism may have an impact on data communication, especially for uplink and downlink Hybrid Automatic Repeat reQuest (HARQ) performance of LAA. In the downlink transmission, for example, before a downlink transmission or a burst of transmissions on an operating carrier of a serving cell, the BS 200 has to perform a CCA check by energy detection. If the energy level in the carrier channel exceeds the predefined threshold, the serving cell is considered not available, since the corresponding carrier channel is occupied; otherwise, it may transmit data immediately or in the following frame period. The BS 200 always needs to perform CCA at the end of an idle period after each data transmission. Therefore, discontinuous transmission for LAA is a basic characteristic because the availability of a transmission opportunity on the unlicensed band cannot be guaranteed. This results in ongoing data transmission, especially for HARQ processes, which may be interrupted due to the requirement of idle period or unavailability of the scheduled serving cell after a CCA check. This problem will be described in detail with reference to the example of FIG. 2b.

Figure 2B:
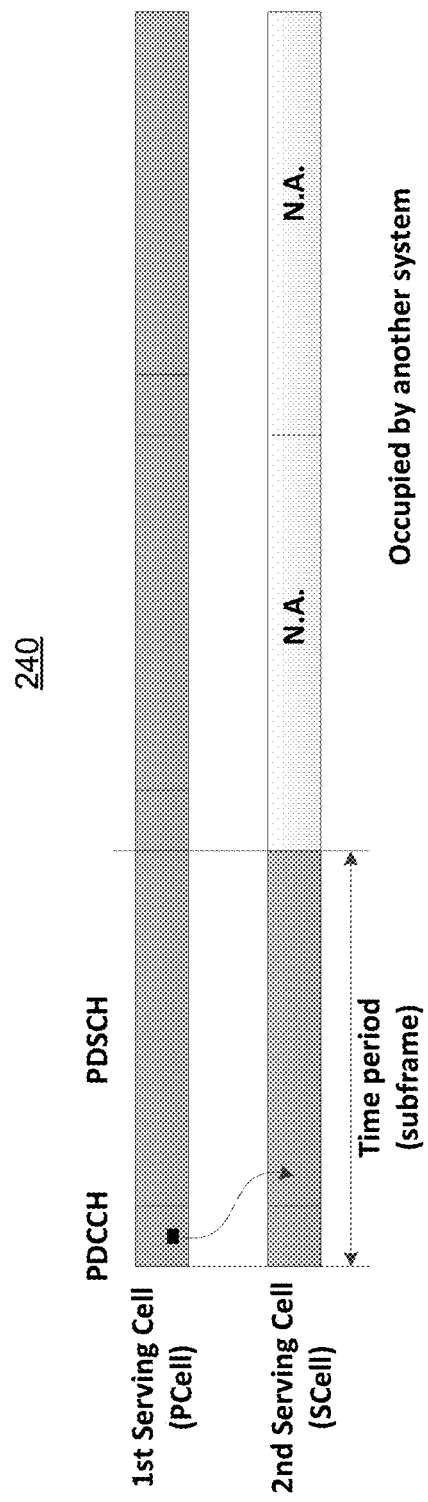
FIG. 2b illustrates a schematic diagram showing the discontinued transmission on the unlicensed band.

FIG. 2b illustrates a schematic diagram showing the discontinued transmission on the unlicensed band in the HARQ process. As shown in FIG. 2b, the first and second serving cells are configured for the UE 210 by the BS 200, where the first serving cell may be a PCell or an SCell operating in the licensed band and the second cell may be an SCell operating in the unlicensed band. The second serving cell (corresponding to SCell, secondary component carrier, or secondary cell) is scheduled by the first serving cell (corresponding to PCell, primary component carrier, or primary cell) via Physical Downlink Control CHannel (PDCCH). Initial transmission of data blocks is scheduled to be performed in the second serving cell during a time period, for example, a sub-frame (1 ms). Before the retransmission for the data blocks that are unsuccessfully received at receiver side, the BS 200 detects the availability of the second serving cell by performing the CCA check on the components carrier of the second serving cell. Due to unavailability of the unlicensed band in the next time period (for example, the unlicensed band may be occupied by a Wi-Fi system), the retransmission of data blocks cannot be sent out until the second serving cell is available again. Data transmission for the UE 210 may suffer from a large transmission delay and the system performance may be severely degraded due to throughput loss.

Embodiments of the subject matter described herein aim to provide a solution to at least partially solve the problems discussed above.

With reference to FIGS. 3-7, various embodiments of the subject matter described herein are set forth in detail.

Figure 3:
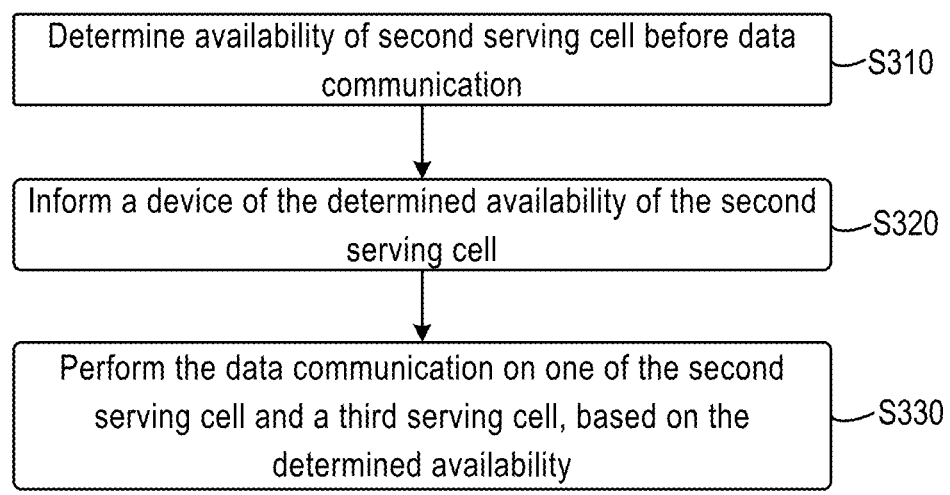
FIG. 3 illustrates a flowchart of a method for wireless communication in accordance with one embodiment of the subject matter described herein.

FIG. 3 illustrates a flowchart of an exemplary method 300 for data transmission in wireless communication in accordance with one embodiment of the subject matter described herein.

It would be appreciated that the method 300 may be implemented by a network node or a device for communicating data blocks with another device in the wireless communication system, e.g., the BS 200 as shown in FIG. 2. In the embodiment as illustrated in FIG. 3, data transmission is scheduled by a first serving cell and transmitted by a second serving cell.

As shown in FIG. 3, the method 300 is entered in step S310, where the BS 200 determines availability of the second serving cell before data transmission. In step S320, the BS 200 informs a device, such as the UE 210, of the determined availability of the second serving cell. Based on the determined availability of the second serving cell, in step S330, the BS 200 performs the data communication on one of the second serving cell and a third serving cell. Specifically, if the scheduled second serving cell is available, the BS 200 performs the data communication in the second serving cell; otherwise, the BS 200 schedules the data communication to be performed in the third serving cell. Since the other party of the data communication, such as the UE 210, can be aware of the availability of the scheduled second serving cell, the other party can know whether the corresponding data communication should be performed in the second serving cell or the third serving cell.

According to an embodiment of the subject matter as disclosed herein, the first serving cell may be operated in the licensed band and the second cell may be operated in the unlicensed band. The second serving cell, which may be an SCell (also referred to as a secondary component carrier or secondary cell), is scheduled by the first serving cell, which may be a PCell (also referred to as a primary component carrier or primary cell) or a licensed SCell via PDCCH.

In order to set forth the inventive concepts of the subject matter as disclosed herein, various embodiments will be described with reference to the scenarios of the downlink HARQ process for LTE LAA. However, those skilled in the art can appreciate that such scenarios of the downlink HARQ process are only non-limited examples for the purpose of illustration, but should not be construed as any limitation to claimed scope. For example, some embodiments of the subject matter as disclosed herein may be applicable to uplink data transmission between BS and UE (for example, uplink HARQ processes) or even D2D transmission between UEs, with suitable modifications in signaling communication.

Figure 4A:
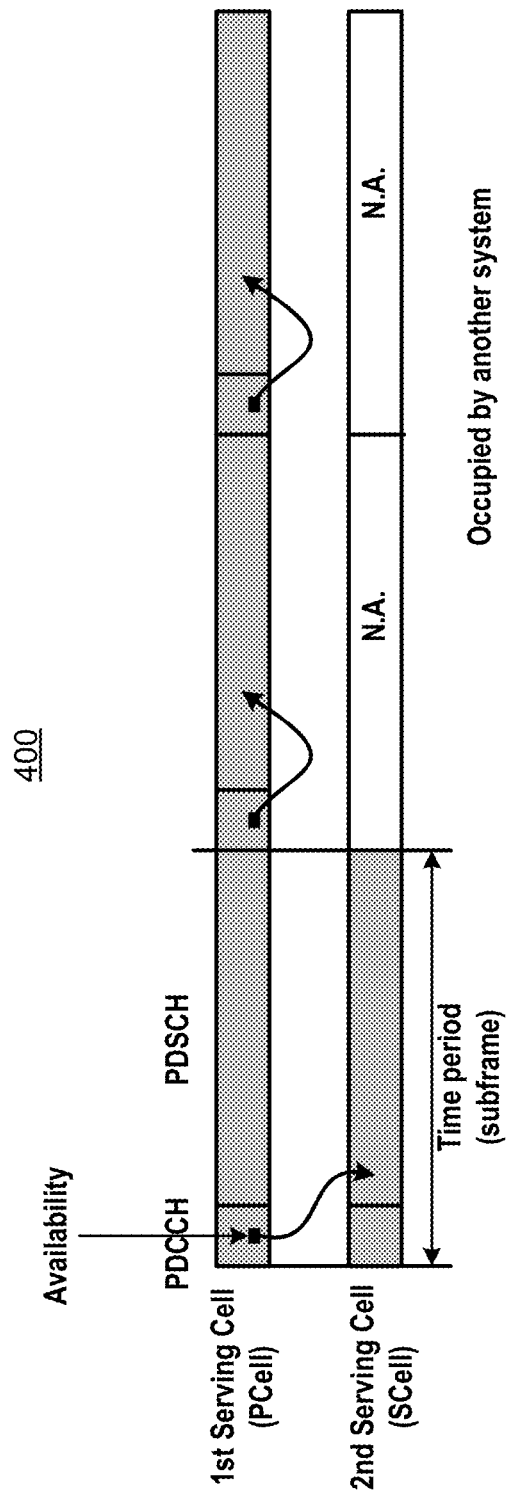
FIG. 4a illustrates a schematic diagram showing that unfinished data transmission is continued in the serving cell scheduling the data transmission.

FIG. 4a illustrates a schematic diagram 400 showing that an unfinished data transmission is continued in the serving cell scheduling the data transmission.

As shown in FIG. 4a, the data communication, for example, the unfinished HARQ processes on the scheduled second serving cell can be continued only in the corresponding scheduling first serving cell. In other words, the third serving cell as described in FIG. 3 may be pre-configured as the first serving cell, which schedules the data communication of the second serving cell. When the BS 200 determines that the second serving cell is not available for the subsequent data communication, the BS 200 may continue the unfinished data communication (for example, the unfinished UL or DL HARQ process) in the first serving cell.
Solution 1

According to one embodiment of the subject matter as disclosed herein, step S320 in FIG. 3 may be implemented by indicating, in downlink control signaling sent from the first serving cell to the device, the determined availability of the second serving cell.

In an exemplary implementation, one bit Channel Availability Indicator (CAI) may be introduced in DL control signaling to indicate whether the second serving cell is available or not in the current time period (for example, the current sub-frame). For example, the DL control signaling may be DL grant signaling for downlink HARQ processes or UL grant signaling for uplink HARQ processes.

In the downlink HARQ processes, for example, if the second serving cell is available, the CAI may be set to, for example, 1 and the DL grant including the CAI could be used to cross-carrier schedule the Physical Downlink Shared CHannel (PDSCH) transmission on the second serving cell. If the second serving cell is not available, the CAI may be set to, for example, 0 and the DL grant including the CAI could be used to schedule PDSCH on the same carrier with the DL grant (i.e., the first serving cell) in order to perform those subsequent HARQ processes which are unfinished in the second serving cell. The scheduled second serving cell is indicated by a Carrier Indicator Field (CIF) in the DL grant transmitted from the scheduling cell. Advantageously, in some examples, the HARQ process number of those subsequent HARQ processes may be kept unchanged when those HARQ are continued in the first serving cell.

In this implementation, the BS 200 can determine the availability of each unlicensed cell by a CCA check and indicate this using the CAI in the DL grant signaling. If the second serving cell is available, the BS 200 may set the CAI to, for example, 1 and transmit PDSCH on the second serving cell; otherwise, the BS 200 may set the CAI to, for example, 0 and transmit PDSCH on the scheduling cell. In this way, the DL retransmission that is unfinished in the second serving cell is continued in PDSCH of the first scheduling cell.

The receiving device, such as the UE 210, does not need to do a CCA check on each unlicensed cell. After detection of the DL grant on the first serving cell, the UE 210 obtains the availability of the second serving cell by the CAI. If the CAI is set to, for example, 1, the UE 210 may try to receive PDSCH transmission on the second serving cell; otherwise, if the CAI is set to, for example, 0, the UE 210 may try to receive PDSCH transmission on the first serving cell. Since the HARQ process number is unchanged, when one unfinished HARQ process of the second serving cell is continued in the first serving cell, the UE 210 can be aware of the corresponding HARQ process of retransmitted PDSCH on the first serving cell and try to combine the received soft bits with the same HARQ process number.

Those skilled in the art can appreciate that the operations of the BS 200 and the UE 210 in the uplink HARQ processes are similar to those in the downlink HARQ processes as above described, except for adopting the UL grant to indicate the CAI. Therefore, the detailed description regarding the operations in the uplink HARQ processes is omitted here for the purpose of conciseness.
Solution 2

According to one embodiment of the subject matter as disclosed herein, step S320 in FIG. 3 may be implemented by indicating the determined availability of the second serving cell via physical layer signaling. The physical layer signaling may include a bitmap corresponding at least to the availability of all serving cells operated on the unlicensed band.

In an exemplary implementation, a Layer 1 (physical layer) signaling called Channel Availability Signaling (CAS) may be introduced to carry a bitmap corresponding to the availability of all serving cells operated on the unlicensed band. The bitmap may also correspond to each SCell irrespective of whether an SCell operates on the licensed band or an unlicensed band. The CAS may have same length with a Downlink Control Information (DCI) format 1C with a new Radio Network Temporary Identity (RNTI), which is common to all the UEs served by the BS 200 and configured/indicated in Radio Resource Control (RRC) signaling. The CAS may be signaled in PCell common search space in one fixed subframe or a specified subframe configured by RRC signaling within each frame period or an RRC signaling configured period. In an advantageous implementation, the time period for which the CAS is updated from the BS 200 to UEs (such as the UE 210) may be aligned to the requirements of LBT. Once the BS 200 obtains the availability of the serving cell operated in the unlicensed band, the BS 200 informs such availability information in the CAS via physical layer signaling. The UEs (for example, the UE 210) are aware of the time period of informing the CAS and the UEs are capable of detecting CAS content. According to the CAS, the UE 210 can obtain the availability of the second serving cell and then the UE 210 can determine that the subsequent data transmission will be continued in one of the first serving cell and the second serving cell based on the availability of the second serving cell.

In this implementation, the BS 200 can determine the availability of each unlicensed cell by a CCA check and indicate that by the CAS signaling. In the downlink HARQ processes, for example, if the second serving cell is available, the corresponding bit value in the CAS may set to, for example, 1 and the BS 200 will transmit PDSCH on the second serving cell based on the determined availability; otherwise, the corresponding bit value in the CAS is set to, for example, 0 and the BS 200 will transmit PDSCH on the first serving cell. In this way, the DL retransmission that is unfinished in the second serving cell is continued in the PDSCH of the first serving cell. Advantageously, in some examples, the HARQ process number of those subsequent HARQ processes may be kept unchanged when those HARQ are continued in the first serving cell.

The receiving device (for example, the UE 210) does not need to do a CCA check on each unlicensed cell. After detection of the CAS signaling in PCell common search space, the UE 210 obtains the availability of each serving cell. If one serving cell (e.g., the second serving cell) is cross-carrier scheduled by the first serving cell and the bit value in the CAS signaling corresponding to this serving cell is set to 1, the UE 210 may try to receive PDSCH transmission on the second serving cell; otherwise, the UE 210 may try to receive PDSCH transmission on the first serving cell. Since the HARQ process number is unchanged, when one unfinished HARQ process of the second cell is continued in the first serving cell, the UE 210 can determine that the corresponding HARQ process of retransmitted PDSCH is in the first serving cell and then try to combine the received soft bits with the same HARQ process number.

Those skilled in the art can appreciate that the operations of the BS 200 and the UE 210 in the uplink HARQ processes are similar to those in the downlink HARQ processes as above described. Therefore, the detailed description regarding the operations in the uplink HARQ processes is omitted here for the purpose of conciseness.

Figure 4B:
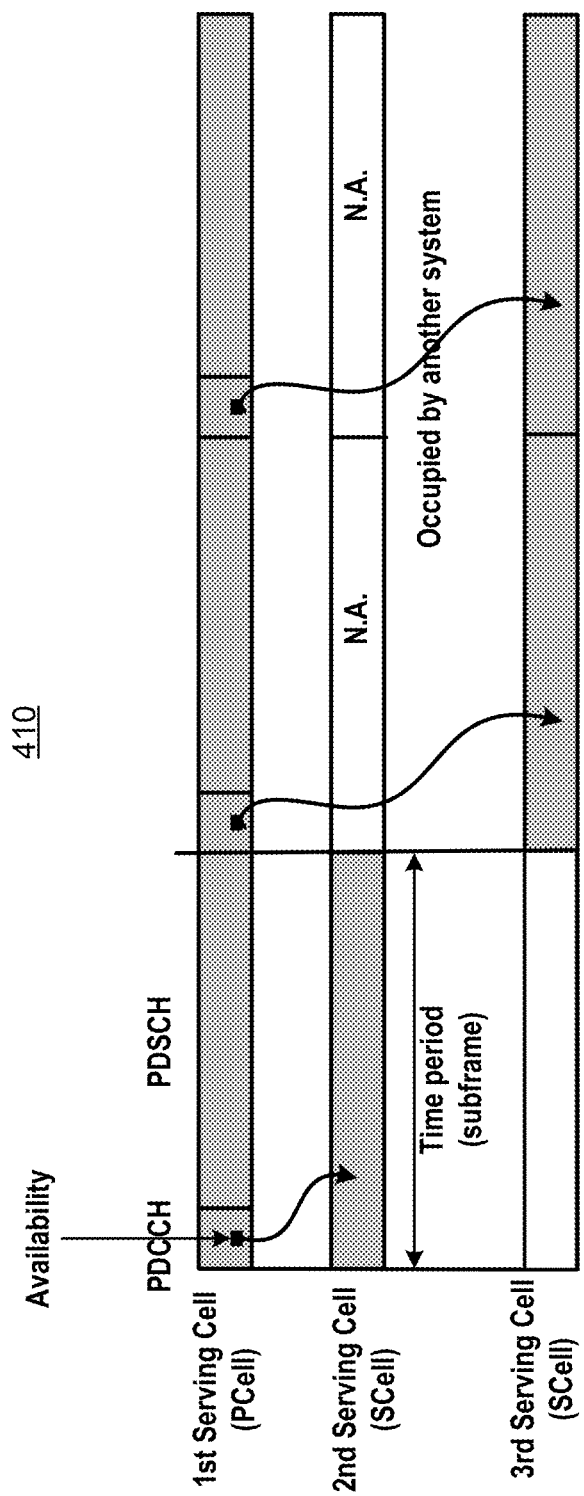
FIG. 4b illustrates a schematic diagram showing that unfinished data transmission is continued in another available serving cell.

FIG. 4b illustrates a schematic diagram 410 showing that unfinished data transmission is continued in another available serving cell.

As shown in FIG. 4b, the data communication (for example, the unfinished HARQ processes on unlicensed scheduled second serving cell) can be continued in another available serving cell (i.e., the third serving cell as described in FIG. 3 may be designated as an available serving cell). The designated available serving cell may be either the first serving cell or another serving cell which is different from the first serving cell, or fixed to PCell, although FIG. 4b shows the third serving cell as a different one from the first serving cell for the purpose of simplicity. When the BS 200 determines that the second serving cell is not available for the subsequent data communication, the BS 200 may continue the unfinished data communication (for example, the unfinished UL or DL HARQ process) in the designated third serving cell.

Solution 3

According to one embodiment of the subject matter as disclosed herein, step S320 in FIG. 3 may be implemented by indicating, in downlink control signaling sent from the first serving cell to the device, the determined availability of the second serving cell. If the second serving cell is not available, the downlink control signaling includes a carrier index to indicate the designated third serving cell.

In one exemplary implementation, a new field called Available Carrier Index (ACI) may be introduced in DL controlling signaling. For example, the DL control signaling may be DL grant signaling for downlink HARQ processes or UL grant signaling for uplink HARQ processes. The ACI field may have the same bit length to the CIF of the DL control signaling. In the downlink HARQ processes, for example, If the scheduled second serving cell indexed by the CIF is available, then the ACI may be set as a default value, such as the same value of the CIF or a zero value. As such, this DL grant is used to cross-carrier schedule the PDSCH transmission on the second serving cell indexed by the CIF. If the scheduled second serving cell indexed by the CIF is not available and another serving cell is available, then the ACI may be set to designate the index of this available serving cell, (i.e., the third serving cell) and this DL grant is used to cross-carrier schedule the PDSCH transmission on the serving cell designated by the ACI in order to continue those unfinished HARQ processes of the second serving cell indexed by the CIF. Advantageously, in some examples, the HARQ process number of those subsequent HARQ processes may be kept unchanged when those HARQ are continued in the first serving cell.

According to this exemplary implementation, in the downlink HARQ processes, for example, the BS 200 can determine the availability of each unlicensed cell by a CCA check. If the scheduled second serving cell indexed by the CIF is available, the BS 200 may set the ACI in the DL grant signaling as the default value, (for example, the same value as the CIF or a zero value) and transmit PDSCH on the scheduled second serving cell indexed by the CIF. If the scheduled second serving cell indexed by the CIF is not available and another serving cell is available, the BS 200 may use the ACI to indicate the index of this designated available serving cell (i.e., the third serving cell) in the DL grant and transmit PDSCH on this designated available serving cell.

The receiving device (e.g., the UE 210) does not need to do a CCA check on each unlicensed cell. After detection of the DL grant in the first serving cell, the UE 210 may firstly check the CIF and ACI. If the ACI is the default value (for example, the same value as the CIF or a zero value), the UE may try to receive PDSCH transmission on the scheduled second serving cell indexed by the CIF. If the ACI designates the carrier index of the third serving cell, the UE may try to receive the PDSCH transmission on the third serving cell indexed by the ACI. Since HARQ process number is unchanged when one unfinished HARQ process of scheduled cell is continued in the available third serving cell, the UE can be aware of the corresponding HARQ process of retransmitted PDSCH and try to combine the received soft bits with the same HARQ process number.

Those skilled in the art can appreciate that the operations of the BS 200 and the UE 210 in the uplink HARQ processes are similar to those in the downlink HARQ processes as above described, except for adopting the UL grant to indicate the ACI. Therefore, the detailed description regarding the operations in the uplink HARQ processes is omitted here for the purpose of conciseness.

Solution 4

According to one embodiment of the subject matter as disclosed herein, the method 300 may further comprise a further step (not shown in FIG. 3) in the scheduling procedure from the first serving cell to the second serving cell, where the BS 200 may indicate, from the first serving cell to the device, a carrier index of the third serving cell via high layer signaling. The step S320 in FIG. 3 may be implemented by indicating the determined availability of the second serving cell via physical layer signaling. The physical layer signaling comprises a bitmap corresponding at least to the availability of all serving cells operated on the unlicensed band.

In exemplary implementation, a Layer 1 (physical layer) signaling called Channel Availability Signaling (CAS) may be introduced to carry a bitmap corresponding to the availability of all serving cells operated on the unlicensed band. Alternatively, the bitmap may also correspond to each SCell (irrespective of the corresponding licensed or unlicensed band). The CAS may have same length with Downlink Control Information (DCI) format 1C with Cyclic Redundancy Check (CRC) scrambled by a new Radio Network Temporary Identity (RNTI), which is common to all the UEs served by the BS 200 and configured/indicated in Radio Resource Control (RRC) signaling. The CAS may be signaled in PCell common search space in one fixed sub-frame or a specified sub-frame configured by RRC signaling within each frame period or a RRC signaling configured period. In an advantageous implementation, the time period, for which the CAS is updated from the BS 200 to UEs (such as the UE 210), may be aligned to the requirements of LBT.

In this implementation, a new field called Backup Carrier Index (BCI) is introduced in RRC signaling during the cross-carrier scheduling procedure from the first serving cell to the second serving cell. The carrier index of the backup serving cell may be informed to the device, such as the UE 210, during the cross-carrier scheduling configuration for the scheduled second serving cell. In some examples, for the sake of reliability, the BCI may be the carrier index corresponding to a licensed carrier. When the second serving cell is configured by RRC signaling for cross-carrier scheduling, the BCI field may be added to the corresponding RRC signaling to indicate the index of its backup carrier. The BCI may be reserved, even if a serving cell on licensed band is configured for cross-carrier scheduling. In some examples, the PCell may be always designated as the backup serving cell. In this way, the BCI field in the RRC signaling for cross-carrier scheduling may be reserved or not needed.

According to this implementation, the BS 200 can determine the availability of each unlicensed cell by a CCA check and indicate that by the CAS in physical layer signaling. In the downlink HARQ processes, for example, if the second serving cell is available, the corresponding bit value in the CAS may be set to, for example, 1 and the BS 200 may transmit PDSCH on this scheduled second serving cell; otherwise, the corresponding bit value in the CAS may be set to, for example, 0 and the BS 200 may transmit PDSCH on the backup carrier indexed by the BCI to complete the unfinished HARQ processes.

The receiving device (for example, the UE 210) does not need to do a CCA check on each unlicensed cell. After detection of the CAS signaling in PCell common search space, the UE 210 can know the availability of each serving cell. When one SCell (e.g., the second serving cell) is cross-carrier scheduled by another serving cell (e.g., the first serving cell and the bit value in the CAS signaling corresponding to the second serving cell is set to, for example, 1), the UE 210 may try to receive PDSCH transmission on this scheduled second serving cell; otherwise, the UE 210 may try to receive PDSCH transmission on its corresponding backup carrier indexed by the BCI. Since the HARQ process number is unchanged, the UE 210 can determine that the corresponding HARQ process of retransmitted PDSCH on the backup carrier and try to combine the received soft bits with the same HARQ process number.

Those skilled in the art can appreciate that the operations of the BS 200 and the UE 210 in the uplink HARQ processes are similar to those in the downlink HARQ processes and the detailed description thereof is omitted here for the purpose of conciseness.

Figure 5:
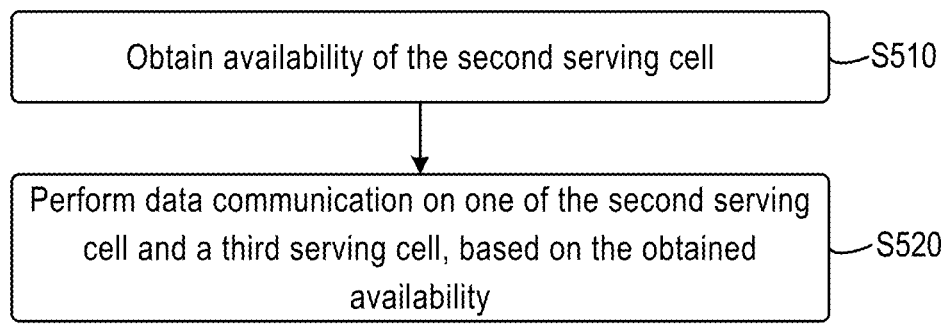
FIG. 5 illustrates a flowchart of a method for wireless communication in accordance with another embodiment of the subject matter described herein.

FIG. 5 illustrates a flowchart of a method 500 for wireless communication in accordance with another embodiment of the subject matter described herein.

It would be appreciated that the method 500 may be implemented by a UE or a device for communicating data blocks with another device in the wireless communication system, e.g., the UE 210 as shown in FIG. 2. In the embodiment as illustrated in FIG. 5, data communication is scheduled from a first serving cell.

As shown in FIG. 5, the method 500 is entered in step S510, where the UE 210 obtains availability of the second serving cell. In step S520, the UE 210 performs data communication on one of the second serving cell and a third serving cell, based on the obtained availability of the second serving cell. According to one embodiment of the subject matter as disclosed herein, the first serving cell may be operated in a licensed band and the second serving cell may be operated in an unlicensed band.

According to one embodiment of the subject matter as disclosed herein, the third serving cell may be the first serving cell. In one exemplary implementation, the UE 210 may obtain the availability of the second serving cell by receiving, from the first serving cell, downlink control signaling including an indicator of the availability of the second serving cell. In another exemplary implementation, the UE 210 may obtain the availability of the second serving cell by receiving physical layer signaling including a bitmap corresponding at least to the availability of all serving cells operated on the unlicensed band.

According to one embodiment of the subject matter as disclosed herein, the third serving cell is a designated available serving cell. In one exemplary implementation, the UE 210 may obtain the availability of the second serving cell by receiving, from the first serving cell, downlink control signaling indicating the availability of the second serving cell. The downlink control signaling may include a carrier index of the third serving cell in case the second serving cell is not available. In another exemplary implementation, the UE 210 may receive high layer signaling including a carrier index of the third serving cell and the UE 210 may obtain the availability of the second serving cell by receiving physical layer signaling including a bitmap corresponding at least to the availability of all serving cells operated on the unlicensed band.

Figure 6:
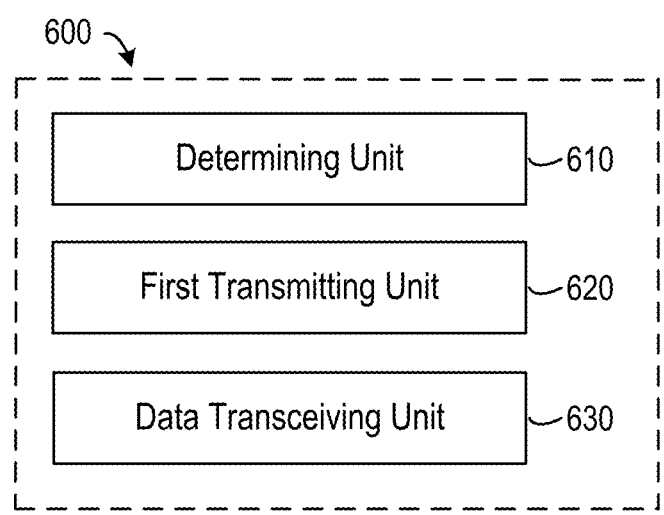
FIG. 6 illustrates a block diagram of an apparatus for wireless communication in accordance with one embodiment of the subject matter described herein.

FIG. 6 illustrates a block diagram of an apparatus 600 for wireless communication in accordance with one embodiment of the subject matter described herein. The apparatus 600 can be implemented as, the BS 200 shown in FIG. 2, or at least a part thereto. Alternatively or additionally, the apparatus 600 may be implemented as any other suitable entity in the wireless communication system. The apparatus 600 is operable to carry out the example method 300 described with reference to FIG. 3 and possibly any other processes or methods. It is also to be understood that the method 300 described with reference to FIG. 3 is not necessarily carried out only by the apparatus 600. At least some steps of the method 300 can be performed by one or more other entities, such as specific functional entities in the wireless communication system.

As shown in FIG. 6, the apparatus 600 comprises a determining unit 610, a first transmitting unit 620 and a data transceiving unit 630. The transmitting unit 610 and the data transceiving unit 620 are functional modules for performing the functionalities of the apparatus 600 in relation to the embodiments of the present subject matter as disclosed herein, rather than specific physical transmitter or transceiver. The first transmitting unit 620 and the data transceiving unit 630 may be implemented by radio transceiver, antenna array and relevant processing and memory circuitry so as to perform control signaling and data transmission.

The determining unit 610 is configured to determine availability of the second serving cell, which is scheduled from the first serving cell for performing data communication, for example, during a HARQ process. The scheduling first serving cell may be operated in a licensed band and the scheduled second serving cell may be operated in an unlicensed band. The first transmitting unit 620 is configured to inform UE of the determined availability of the second serving cell. And the data transceiving unit 630 is configured to perform the data communication on one of the second serving cell and a third serving cell, based on the availability of the second serving cell determined by the determining unit 610.

According to one embodiment of the present subject matter as disclosed herein, the third serving cell may be the first serving cell that schedules the second serving cell. In an exemplary implementation, the first transmitting unit 620 may be configured to transmit to the UE, via the first serving cell, downlink control signaling including an indicator to indicate the availability of the second serving cell. In another exemplary implementation, the first transmitting unit 620 may be configured to transmit to the UE physical layer signaling including a bitmap corresponding at least to the availability of all serving cells operated on the unlicensed band.

According to one embodiment of the present subject matter as disclosed herein, the third serving cell is a designated available serving cell. In an exemplary implementation, the first transmitting unit 620 is configured to transmit to the UE, via the first serving cell, downlink control signaling including an available carrier index, designating the available serving cell to perform the subsequent data transmission. In case the second serving cell is not available, the available carrier index indicates a carrier index of the third serving cell. In another exemplary implementation, the apparatus 600 may comprise a second transmitting unit (not shown in FIG. 6) configured to transmit to the UE, via the first serving cell, high layer signaling including a carrier index of the third serving cell. In this implementation, the first transmitting unit 620 may be configured to transmit physical layer signaling including a bitmap corresponding at least to the availability of all serving cells operated on the unlicensed band.

As described above, the apparatus 600 may be used to improve measurement in both a licensed and unlicensed bands.

Figure 7:
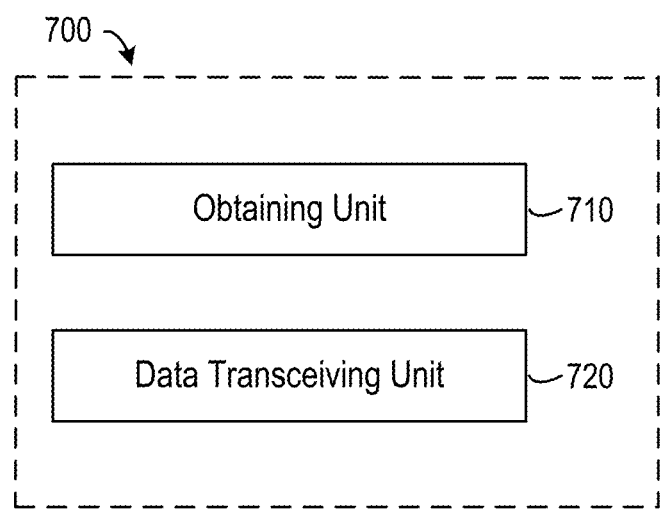
FIG. 7 illustrates a block diagram of an apparatus for wireless communication in accordance with another embodiment of the subject matter described herein.

FIG. 7 illustrates a block diagram of an apparatus 700 for wireless communication in accordance with another embodiment of the subject matter described herein. The apparatus 700 can be implemented as, the UE 210 shown in FIG. 2, or at least a part thereto. Alternatively or additionally, the apparatus 700 may be implemented as any other suitable entity in the wireless communication system. The apparatus 700 is operable to carry out the example method 500 described with reference to FIG. 5 and possibly any other processes or methods. It is also to be understood that the method 500 described with reference to FIG. 5 is not necessarily carried out only by the apparatus 700. At least some steps of the method 500 can be performed by one or more other entities, such as specific functional entities in the wireless communication system.

As shown in FIG. 7, the apparatus 700 comprises an obtaining unit 710 and a data transceiving unit 720.

The obtaining unit 710 is configured to obtain availability of the second serving cell. The data transceiving unit 720 is configured to perform data communication on one of the second serving cell and a third serving cell, based on the availability of the second serving cell obtained by the obtaining unit 710. According to one embodiment of the subject matter as disclosed herein, the first serving cell may be operated in a licensed band and the second serving cell may be operated in an unlicensed band.

According to one embodiment of the subject matter as disclosed herein, the third serving cell may be the first serving cell. In one exemplary implementation, the obtaining unit 710 may be configured to obtain the availability of the second serving cell by receiving, from the first serving cell, downlink control signaling including an indicator to indicate the availability of the second serving cell. In another exemplary implementation, the obtaining unit 710 may be configured to obtain the availability of the second serving cell by receiving physical layer signaling including a bitmap corresponding at least to the availability of all serving cells operated on the unlicensed band.

According to one embodiment of the subject matter as disclosed herein, the third serving cell is a designated available serving cell. In one exemplary implementation, the obtaining unit 710 may be configured to obtain the availability of the second serving cell by receiving, from the first serving cell, downlink control signaling indicating the availability of the second serving cell. The downlink control signaling may include a carrier index of the third serving cell in the case that the second serving cell is not available. In another exemplary implementation, the UE 210 may comprises a receiving unit (not shown in FIG. 7) configured to receive high layer signaling including a carrier index of the third serving cell. In this implementation, the obtaining unit 710 may be configured to obtain the availability of the second serving cell by receiving physical layer signaling including a bitmap corresponding at least to the availability of all serving cells operated on the unlicensed band.

It is to be understood that, though in some embodiments of the subject matter described herein, methods and apparatus are described in the context of a cellular system, particularly a LTE LAA system, embodiments of the subject matter described herein are not limited thereto.

The modules/units included in the apparatuses 600 and/or 700 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses 600 and/or 700 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

In addition, some units or modules in the apparatus 600 or 700 can be combined in some implementations. For example, in one embodiment, it is possible to use a single transceiver to function as the transmitting unit 620 and the data transceiving unit 630 in the apparatus 600 as discussed above. Likewise, a single transceiver may function as the obtaining unit 710 and the data transceiving unit 720 in the apparatus 700 as discussed above.

Generally, various embodiments of the subject matter described herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the subject matter described herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the subject matter can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for wireless communication, comprising:
   determining availability of a second serving cell before data communication, wherein the data communication is scheduled from a first serving cell;
   informing a device of the determined availability of the second serving cell through downlink control signaling; and
   performing the data communication on one of the second serving cell or a third serving cell after the availability is determined of the second serving cell, wherein the third serving cell the third serving cell is configured as the first serving cell, and the third serving cell schedules the data communication of the second serving cell.

2. The method of claim 1, wherein the first serving cell is operated in a licensed band and the second serving cell is operated in an unlicensed band.

3. The method of claim 1, further comprising directing the first serving cell to schedule the second serving cell, via a Physical Downlink Control Channel (PDCCH), to perform the data communication.

4. The method of claim 1, further comprising:
   determining the second serving cell is available; and
   incident to the second serving cell being available, performing the data communication on the second serving cell instead of the third serving cell.

5. The method of claim 1, further comprising:
   determining the second serving cell is unavailable; and
   incident to the second serving cell being unavailable, performing the data communication on the third serving cell.

6. The method of claim 1, wherein informing the device of the determined availability of the second serving cell comprises:
   indicating the determined availability of the second serving cell via physical layer signaling, wherein the physical layer signaling comprises a bitmap corresponding at least to the availability of a plurality of serving cells operated on the unlicensed band.

7. The method of claim 1, wherein said informing the device of the determined availability of the second serving cell comprises indicating, in downlink control signaling sent from the first serving cell to the device, the determined availability of the second serving cell.

8. The method of claim 7, wherein the downlink control signaling includes a carrier index of the third serving cell because the second serving cell is not available.

9. The method of claim 1, wherein the data communication is communicated using an uplink or a downlink Hybrid Automatic Repeat reQuest (HARQ) process.

10. The method of claim 1, wherein availability of the second serving cell is indicated in a one-bit Channel Availability Indicator (CAI).

11. A method for performing data transmission of a wireless communication from a user device using one or more of a first serving cell, a second serving cell, or a third servicing cell, comprising:
    determining availability of a second serving cell before the data communication, wherein availability of the second serving cell is indicated in a one-bit Channel Availability Indicator (CAI);
    obtaining availability of a second serving cell; and
    performing data communication on one of the second serving cell or a third serving cell based on the obtained availability of the second serving cell, wherein the data communication is partially transmitted using the second serving cell and partially transmitted using the third serving cell.

12. The method of claim 11, wherein the downlink control signaling comprises downlink grant signaling for one or more downlink or uplink Hybrid Automatic Repeat reQuest (HARQ) processes.

13. The method of claim 11, further comprising:
    determining the second serving cell is available; and
    incident to said determination, cross-carrier scheduling a Physical Downlink Shared Channel (PDSCH) on the second serving cell.

14. The method of claim 11, further comprising:
    determining the second serving cell is unavailable; and
    incident to said determination, scheduling a Physical Downlink Shared Channel (PDSCH) on the third serving cell.

15. An apparatus for wireless communication, comprising:

a determining unit configured to determine availability of a second serving cell operated in an unlicensed band before data communication, wherein the data communication is scheduled by a first serving cell operated in a licensed band;

a first transmitting unit configured to inform User Equipment (UE) of the determined availability of the second serving cell through downlink control signaling; and a data transceiving unit configured to perform the data communication on one of the second serving cell or a third serving cell, based on the determined availability of the second serving cell, wherein the third serving cell is a designated available serving cell, wherein the first transmitting unit is configured to transmit, via the first serving cell, the downlink control signaling including an available carrier index, and wherein in the case that the second serving cell is not available, the available carrier index indicates a carrier index of the third serving cell.

16. The apparatus of claim 15, wherein availability of the second serving cell is indicated in a one-bit Channel Availability Indicator (CAI).

17. The apparatus of claim 15, wherein the data communication is partially transmitted using the second serving cell and partially transmitted using the third serving cell.

18. The apparatus of claim 15, wherein the downlink control signaling comprises downlink grant signaling for one or more downlink or uplink Hybrid Automatic Repeat reQuest (HARQ) processes.

19. The apparatus of claim 15, wherein the third serving cell is configured as the first serving cell, and the third serving cell schedules the data communication of the second serving cell.

20. The apparatus of claim 15, wherein the third serving cell is a designated available serving cell, wherein a second transmitting unit is configured to transmit, via the first serving cell, high layer signaling including a carrier index of the third serving cell, and wherein the first transmitting unit is configured to transmit physical layer signaling including a bitmap corresponding at least to the availability of all serving cells operated on the unlicensed band.

* * * * *